US00RE34807E

United States Patent [19]

Schaub et al.

[11] E Patent Number: Re. 34,807

[45] Reissued Date of Patent: Dec. 20, 1994

[54] COMBUSTION SYSTEM FOR DUAL FUEL ENGINE

[75] Inventors: Frederick S. Schaub, Mt. Vernon; Jesse G. Smith, Fredericktown, both of Ohio

[73] Assignee: Cooper Industries, Inc., Houston, Tex.

[21] Appl. No.: 71,539

[22] Filed: Jun. 4, 1993

Related U.S. Patent Documents

Reissue of:

[64] Patent No.: 4,966,103
Issued: Oct. 30, 1990
Appl. No.: 434,023
Filed: Nov. 9, 1989

[51] Int. Cl.[5] ..... F02B 3/00

[52] U.S. Cl. ..... 123/276

[58] Field of Search ..... 123/300, 305, 256, 260, 123/276 E, 525, 526, 527, 575, 261, 276

[56] References Cited

U.S. PATENT DOCUMENTS

| | | | |
|---|---|---|---|
| 2,799,256 | 7/1957 | Stump | 123/575 |
| 4,079,538 | 7/1978 | Foster | 123/525 |
| 4,368,702 | 1/1983 | Finsterwalder et al. | 123/261 |
| 4,543,930 | 10/1985 | Baker | 123/276 |
| 4,603,674 | 8/1986 | Tanaka | 123/575 |
| 4,784,097 | 11/1988 | Ishida | 123/276 |

FOREIGN PATENT DOCUMENTS

| | | | |
|---|---|---|---|
| 323507 | 7/1920 | Germany | 123/575 |

*Primary Examiner*—Raymond A. Nelli
*Attorney, Agent, or Firm*—Laff, Whitesel, Conte & Saret, Ltd.

[57] ABSTRACT

We provide a torch cell for a dual gas-liquid fuel engine, the torch cell has a torch cell nozzle at one end thereof and the other end having appropriate means to connect said torch cell to a fuel supply. A fuel injector is mounted in said torch cell at a predetermined angle to an axis of said torch cell. The torch cell has an auto-ignition chamber that is in operative communication with the injector by an injector nozzle passageway. The injector nozzle passageway enters the auto-ignition chamber at a predetermined angle relative to the cell axis. The torch cell provides an improved dual fuel engine and method for operating a dual fuel engine by use of its autoignition chamber. We also provide a cylinder head which can replace present dual fuel engine cylinder heads. Our cylinder head has at least one of our torch cells operatively connected to the cylinder head.

47 Claims, 6 Drawing Sheets

COMBUSTION SYSTEM FOR DUAL FUEL ENGINE

Matter enclosed in heavy brackets [ ] appears in the original patent but forms no part of this reissue specification; matter printed in italics indicates the additions made by reissue.

This invention relates to an improved combustion system for dual fuel engines.

BACKGROUND OF THE INVENTION

Stationary reciprocating engines operating on natural gas or other gaseous fuels use energy for ignition from a spark or from a small pilot quantity (typically five percent of the total fuel) of a liquid fuel having an adequate cetane number (typically diesel fuel oil) injected directly into the combustion chamber. The pilot ignited engines serve the major industrial markets since they exceed the spark ignited engines in durability and rating capability and offer convertibility to and from full diesel fueling while in operation. These pilot ignited engines are referred to as "gas diesel" or "dual fuel" engines.

Typical dual fuel engines are evidenced by U.S. Pat. Nos. 4,603,674 to Tamaka; 4,463,734 to Akeroyd; and 4,527,516 to Foster.

Also control of engine emissions, particularly $NO_x$ emissions, has become a concern as evidenced by U.S. Pat. Nos. 4,306,526 to Schaub et al; and 4,524,730 to Doell et al.

Although the pilot ignited engine represents the most fuel efficient prime mover in commercial use at this time, these engines exhibit objectionable levels of exhaust emissions which are detected by analytical procedures and observed visually as yellow in color. Extensive work at the research level has related the objectional emissions levels to the competition of the liquid pilot fuel and the primary gaseous fuel for available oxygen. This competition for oxygen favors the gaseous fuel bulk and starves the fraction of the pilot fuel.

SUMMARY OF THE INVENTION

An object of the present invention is to control exhaust emissions, i.e., control yellow haze in dual fuel mode, as well as to generally extend control of other exhaust emissions.

Another object of the present invention is to improve fuel consumption, to improve power quality, and to extend the application of the dual fuel engine line.

A further object of the present invention is to bring about the above objects in a simplistic fashion that is cost effective, that establishes the durability of components and provides a flexibility of application of the invention.

The implementation of these objects can be obtained by use of the present invention which relates to the provision of an externally disposed fluid fueled torch cell assembly that is in communication with the main piston chamber, such a cell providing means for optimum ignition of the main chamber fuel lean gaseous fuel mixture at the time of maximum compression at the top of the compression stroke.

Still another object of the present invention is to provide an external, independent torch cell assembly which can be readily utilized in retrofit situations as well as in original equipment manufacture.

Other objects will become apparent to those skilled in the art when the specification is read in conjunction with the drawings.

DETAILED DESCRIPTION OF THE PREFERRED EMBODIMENT

Figure 1:
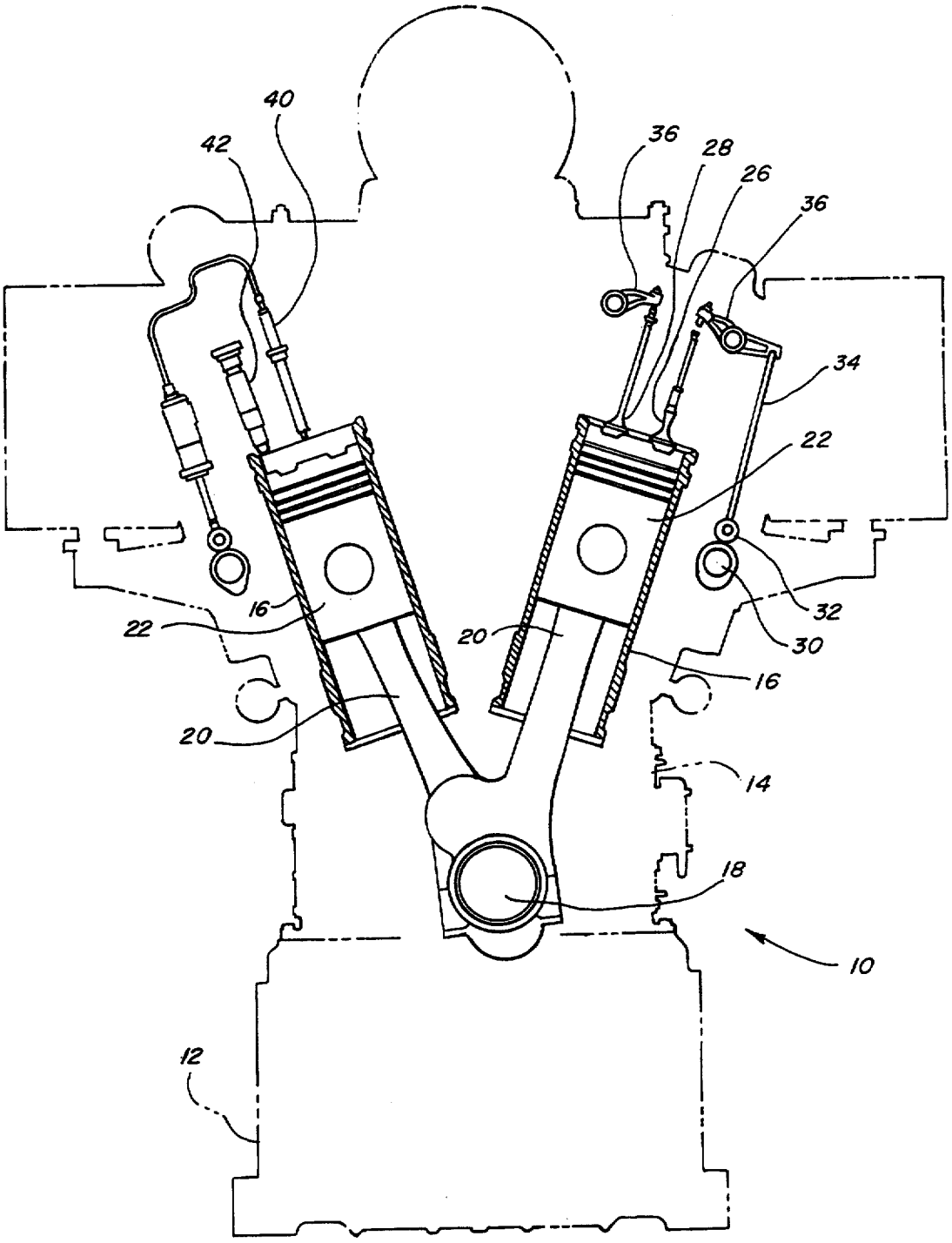
FIG. 1 is a transverse elevational view in partial cross-section of a typical V-type, four-cycle engine design engineered for high-horsepower, continuous-duty operation.
Figure 2:
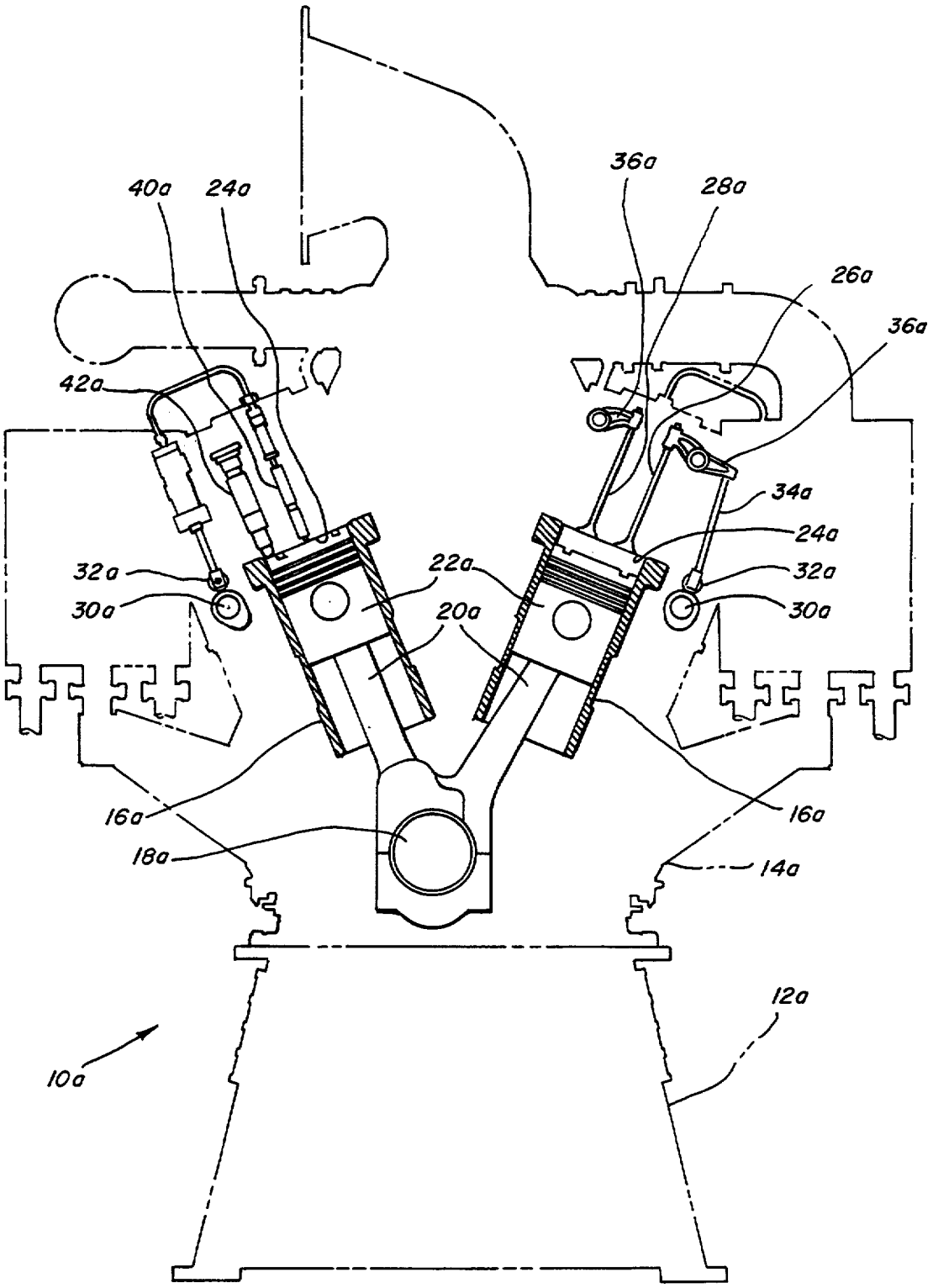
FIG. 2 is a transverse elevational view in partial cross-section of a similar lighter weight engine for standby duty, offshore and marine applications, that operates at a slightly higher speed.

Referring now to the drawings, particularly FIGS. 1 and 2, wherein similar parts are designed by similar numerals, in FIG. 1 a typical engine 10 of the type with which the present invention is contemplated to be used includes a base 12 that supports a centerframe 14 on which is mounted a plurality of cylinders blocks 16 disposed in spaced "V" arrangement relative to said centerframe. Preferably, said base, said centerframe, and said plurality of cylinder blocks are each manufactured in one piece to provide maximum rigidity and permanent alignment when joined. An axially disposed power crankshaft 18 is mounted in said centerframe, supported by suitable bearings along its length, and is joined by connecting rods 20 to complimentary pistons 22 each disposed within the bore of a cylinder block 16. Each cylinder is blocked at its upper end by a suitable head 24 that normally includes two inlet valves 26 and two exhaust valves 28, preferably, the valve seats are of the insert type and made of high-heat-resistant material. The valves are operated by suitably timed camshafts 30 engaging cam rollers 32 having pushrods 34 and acting through rockers 36, or other suitable means to actuate the valves in timed relation. Disposed generally on the axis of the cylinder head 24 intermediate the valves 26 and 28 is a fuel injection nozzle 40, as is normal in standard diesel type engines. Also, the injector 40 may be a multi-hole injector as shown in copending application of [Helmeich] *Helmich* entitled LOW EMISSION DUAL FUEL ENGINE AND METHOD OF OPERATING SAME. There is also the additional valve 42 for starting the single fuel diesel engine by moving the cylinders by compressed air until the compressive force of the pistons will heat the air and fuel mixture to the point of ignition when combustion takes place in a normal operating fashion. The various parts of the lighter duty engine in FIG. 2 are designated by similar numerals with the addition of the suffix "a".

The dual engine of FIG. 1 is a LSVB four cycle engine and the dual engine of FIG 2 is KSV four cycle engine. Both are manufactured by Cooper-Bessemer, a Division of Cooper Industries the assignee of this invention. The dual fuel engines include a plurality of cylinders and are typically built with 12, 16 or 20 cylinders. The LSVB and KSV engine are modified with our torch cell assembly 50 (FIGS. 3 and 4).

Our torch cell is mainly applicable for any type of large reciprocating engine whether stationary or mobile. The large engines provide the best economics of our invention with regard to efficiency.

Figure 3:
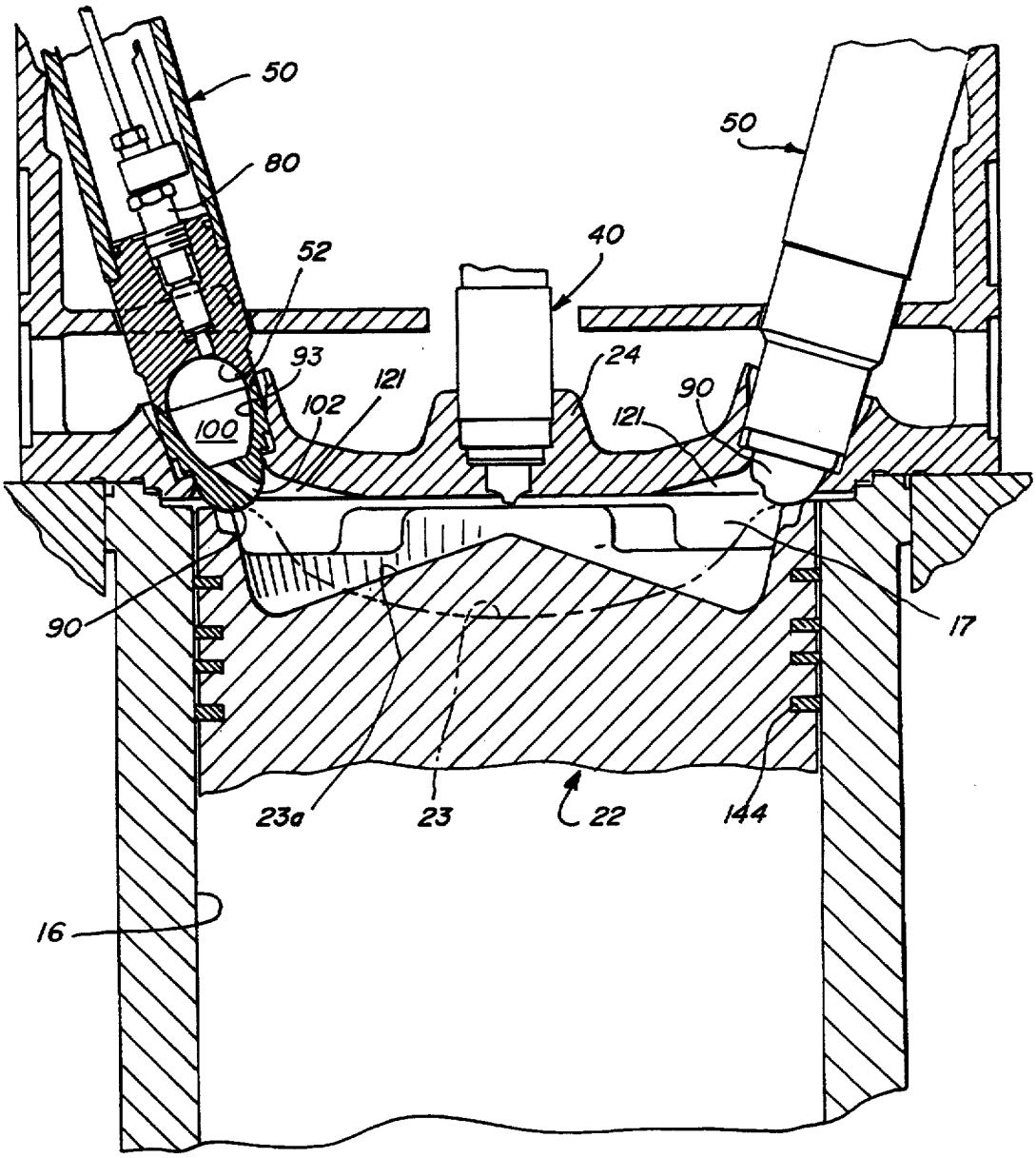
FIG. 3 is a schematic partial cross-section of a combustion chamber incorporating the improved torch cell assembly, emboding the teachings of the present invention, for use in the fuel gas mode of operation and a standard injection nozzle for use in the fuel diesel mode.
Figure 4:
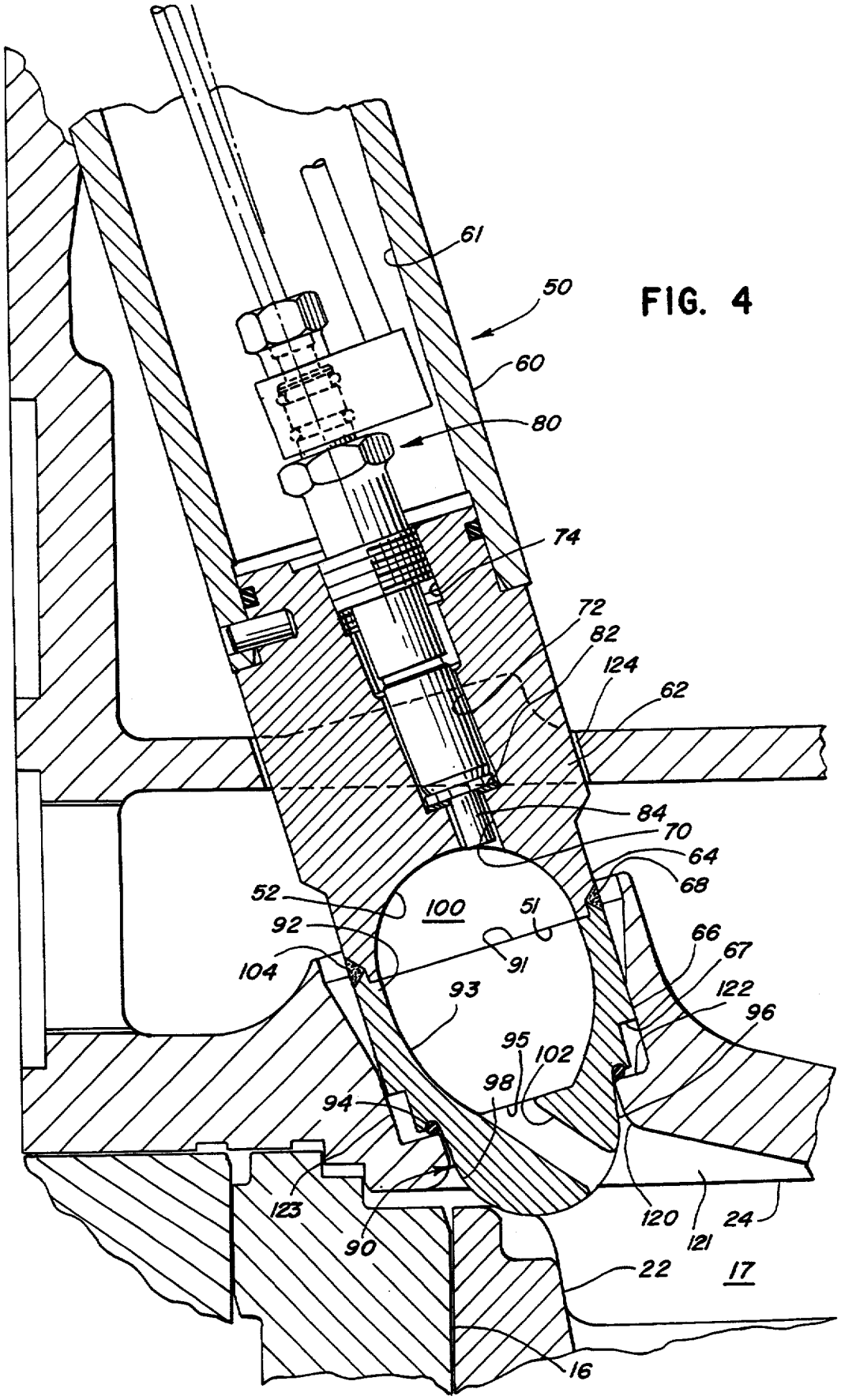
FIG. 4 is an enlarged elevational view in partial section of the torch cell in FIG. 3.
Figure 6:
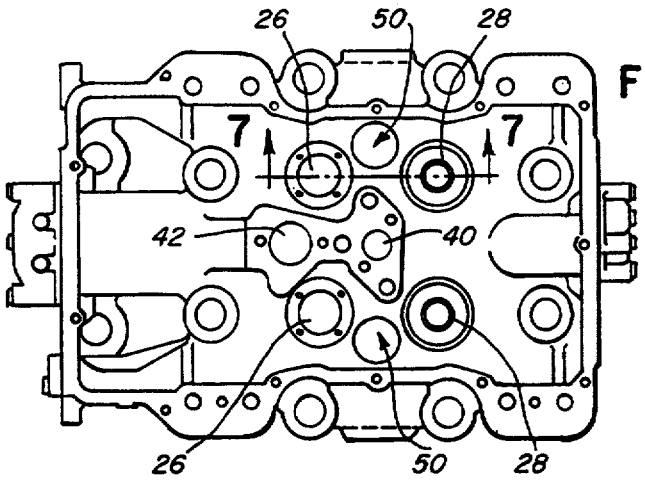
FIG. 6 is a bottom elevational view taken along line 6—6 of FIG. 5 of the cylinder head with the cover removed.
Figure 5:
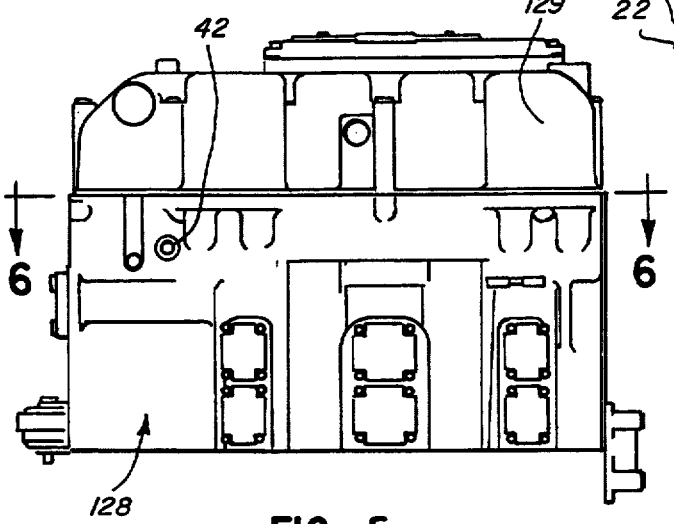
FIG. 5 is a side elevational view of a cylinder head assembly of the type contemplated by the present invention.
Figure 9:
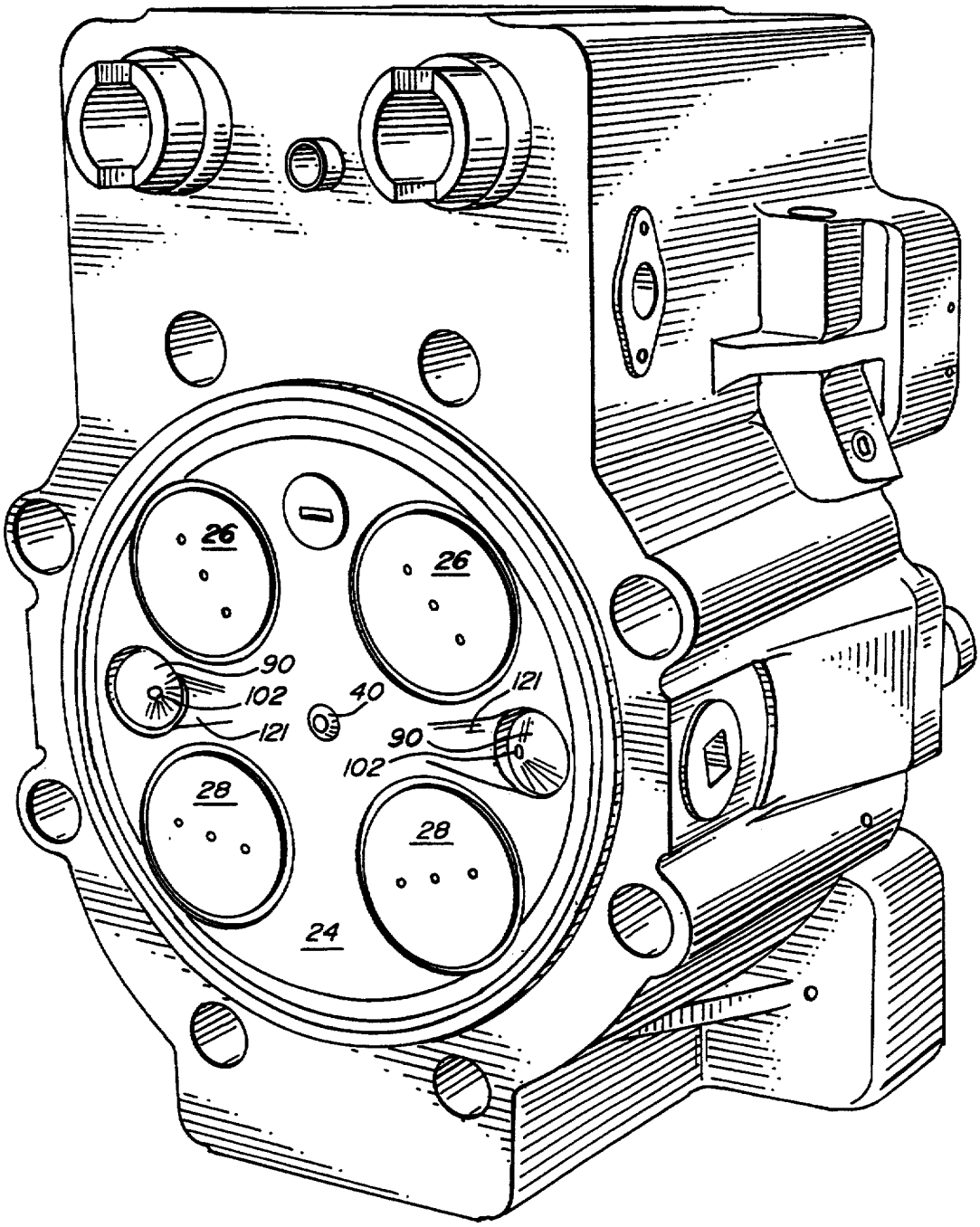
FIG. 9 is a perspective view of a cylinder head of the present invention.

Referring to FIGS. 3, 4, and 9, our invention is illustrated by a four-cycle engine cylinder which is normally fueled by gaseous fuel and has two torch cell assemblies 50 that are ignited by a relatively small quantity of liquid pilot fuel. The torch cell auto-ignition chamber 100 is generally a segmented sphere-paraboloid shape and usually [the] *its* volume *or when there are two torch cells the combined volume of the two auto-ignition chambers would provide an auto-ignition chamber volume that* would typically represent one to five percent of the volume of the main chamber 17 defined by the piston 22, the cylinder head 24 and the walls of the cylinder 16 at the top of the piston's stroke, however, the size of auto-ignition [chamber] *chambers* 100 can run as high as twenty-five percent of the volume of the main cylinder chamber 17, in a small engine, when the stroke is at its uppermost position. Such a torch cell chamber 100 would provide adequate delivery of thermally and chemically active species to ignite the fuel lean contents of the main chamber 17. (Lean burning is an effective control mechanism for certain emissions, including oxides of nitrogen particularly from gaseous fuel.)

Referring now to FIG. 4, which is an enlarged view of the showing of the torch cell assembly 50 shown in FIG. 3; the assembly 50 includes a generally tubular injector body 60 having a solid end portion 62 that is annularly relieved in spaced portions, as at 64 and 68, to present an annular shoulder 66 forming a radial abutment 67, for purposes set forth hereinafter. The free end of the solid portion 62 is provided with a generally segmented spherical cavity 52 having the segment portion 51 preferably at the center of the sphere, i.e., being a hemi-spherical cavity, and having a predetermined volume for the particular engine with which it is to be associated. The cavity 52 is generally symmetrical about the axis of the tubular body 60 and communicates with the interior of tubular body 60 by means of an angularly disposed passageway 70 that is double counterbored as at 72 and 74 and opening outwardly into the interior cavity or chamber 61 of the tubular body 60 away from the cavity 52.

The geometry of the torch cell chamber may be configured to include a shelf or pocket to control vaporization, mixing and ignition.

An injector 80 is threaded into counterbore 74, seated against sealing means 82 located at the base of counterbore 72, and includes a spigot or nozzle 84 extending into passageway 70. The injector 80 is disposed slightly askew and angularly positioned relative to the co-axial disposition of the body 60 and the cavity 52 so that the passageway 70 enters the cavity 52 slightly off of being tangential thereto for purposes set forth hereinafter.

The injector may be a multi-hole injector as shown in copending application of [Helmeich] *Helmich* entitled LOW EMISSION DUAL FIEL ENGINE AND METHOD OF OPERATING SAME; a single hole pintle nozzle or a nozzle design dictated by the nature of ignition substances other than fuel oil.

A nozzle 90 having a laterally extending undercut and chamfered head 92 presents a narrow rim-like edge 94, for sealing engagement as set forth hereinafter, and includes a segmented paraboloid cavity 93 that is complimentary to the cavity 52 at its straight paraboloid end 91 and has its segment portion 95 at its other end. The cavities 52 and 93 are combined to form a generally segmented sphere-paraboloid chamber 100.

The external configuration of the body of nozzle 90 extending down from head 92 is double tapered to provide frusto-conical portion 96 and conical tip 98. Cavity 93 communicates with the cone 98 by means of the passageway 102 that is substantially tangentially disposed relative to the surface of cavity 93 and generally perpendicular to the generated surface of cone 98. The passageway 102 is slightly elevated away from the tangential line falling on the segmented spherical cavity formed in the end of the piston 22 when it is in the uppermost position of the stroke.

The nozzle 90 is joined with the free end of solid portion 62 by means of a bead of welding or brazing 104 filling the chamfered outside edge of their mating end and head surfaces.

The cylinder head 24 is provided with an angularly disposed passage 120 having an axially spaced counterbored seat 122 in passage 123 against which the nozzle head rim 94 will sealing engage and an additional axially spaced passage 124 for supporting and aligning the tubular body 60. The shoulder means 66 can be press fit into passage 123 and preferably is provided suitable means, not shown, for orienting the passage 102 relative to the main cylinder chamber 17. Similarly, the tapered portion 96 is brought to bear on the sharp edge defined by the intersection of passageway 120 and the counterbore seat 122.

A portion of the surface of the head 24 connected to passageway 120 is shaped to form a tapered groove 121. The nozzle passageway 102 points toward the tapered groove 121.

The fuel cell 50 is an auto-ignition fuel-cell—i.e., a fuel cell which only has an auto-ignition chamber 100 and excludes the use of a spark means (i.e, spark plug) or similar external ignition means in direct communication with the chamber 100.

Referring now to FIGS. 5–7 and 9, the cylinder head assembly 128 includes a cover 129 which when removed exposes the orientation of gas inlet or admission valves 26 and the exhaust valves 28, with the torch cell assembly 50 being disposed intermediate thereof. Hardened rings 130 and 132 are installed in the valve seats 26 and 28, respectively.

Figure 8:
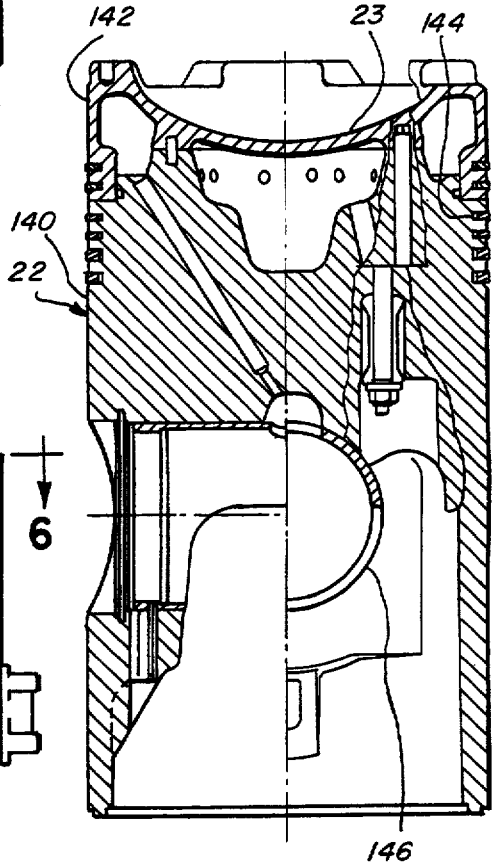
FIG. 8 is a elevational view in section of a piston of the type contemplated for use in the present invention.
Figure 7:
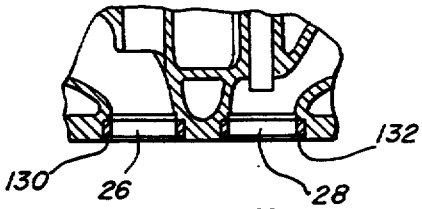
FIG. 7 is a partial sectional view taken along line 7—7 in FIG. 6 showing the valve seat inserts.

As best seen in FIG. 8, the pistons 22 utilized with this invention preferably have a truncated spherical configuration in their upper end surface 23. The piston may be of the one piece cast variety or may be of the two piece configuration illustrated with a steel head 142 fastened to the piston trunk 140. Suitable sealing rings 144 are provided as well as a bushing variety of bearing 144 for the piston pin, not shown. This truncated spherical piston head 142 is the preferred design for all gas mode engines. In FIG. 3 this preferred configuration is shown by an interrupted line designated 23, while the solid line 23a designates the piston head normally used for diesel fuel engines.

The diesel mode is normally utilized in starting dual fuel engines, even though the hemi-spherical piston heads are not the most efficient variety in the diesel mode they are acceptable for the function to which they are subjected, namely, starting, warming up and operating the engine in the fuel diesel mode. Even when the diesel mode is utilized for starting, warming up and providing full capability, the torch liquid fuel cell is still operating in order to keep it clean even though that may not be necessary, as well as having the torch cell immediately available when the fuel source is switched to gaseous fuel.

This invention can also be utilized on a two cycle engine as well as a four cycle engine. The diameter of pistons utilized in such engines are generally in the range of 14 to 20 inches with the particular stroke not being of prime importance. In the operation of the gaseous mode, the torch fuel cell is continuously being ignited. It is preferably to use a rich fuel mixture, which means less than 10 to 1 air to fuel ratio, that is, a preferable ratio is 8 to 1. A lean mixture would be greater than the 10 to 1 ratio of air, meaning approximately 12 to 1.

The cetane rating of the liquid fuel should be such that it will ignite under a predetermined temperature and pressure. The gas ignition rating is such that it would not ignite under such predetermined pressure alone and therefore, it is necessary to utilize the liquid fuel torch cell. The torch cell and its liquid fuel are so designed that it will ignite under the pressure of the materials being compressed in the top cell chamber. While connected by the communicating bore 102 between the chamber 100 and the main piston chamber 17 the torch cell receives the hot compressed gases from the compression stroke of the piston 22 and these are brought into the chamber 100 in a swirling flow by the tangential disposition of the bore 102, the liquid fuel is introduced angularly relative to the flow of compressed air and will either ignite from the heat of the air or will ignite when it contacts the wall of the chamber 100 and will immediately flow both chemically as well as thermally out the bore 102 and serve to ignite the compressed gaseous fuel in the main chamber 17.

It is important to remember that the torch cell assembly 50 is external and not part of the cylinder chamber, hence, the torch cell can be utilized both as a part of original equipment being manufactured as well as being available for a relatively simple retrofit for older single fuel engines or as improvements for other dual fuel engines.

The torch cell also will provide a controlled fuel rich burning within the torch cell. (Rich burning is also an effective control mechanism for certain emissions including oxides of nitrogen and including liquid fuels.)

The torch cell will further allow the use of a very small quantity of liquid fuel since the function of the liquid fuel can now be directed to the simple ignition of the easily ignited controlled mixture of the torch cell.

By use of this invention the task of providing energy to ignite the lean main combustion chamber has been shifted from the direct injection of liquid pilot fuel in the combustion chamber, to, a controlled combustion torch cell with energy provided predominantly by gaseous fuel and easily ignited by a small quantity of liquid pilot fuel.

Scavenging of the torch cell and gaseous fuel admission to the torch cell are accomplished by pressure changes within the engine cylinder during the expansion and compression events but aids to scavenging may be provided by timed or untimed valving and or porting using common or separate source of air and or fuel relative to said torch cell, but not shown in these drawings.

Ignition of the torch cell is normally accomplished by injection of a quantity of fuel (ignition substance) with sufficient auto-ignition capability (cetane number) to accomplish start of combustion upon penetration to the torch cell air/fuel mixture which has been raised to a given temperature by cylinder compression. Ignition may also be initiated by contact of the ignition substance with the hot surface of the torch cell. Any of several types of externally powered heaters may also be employed.

Fuel oil with acceptable cetane rating is currently available at a cost effective level for the ignition substance but other liquids or gases may be selected based on ignition capability, emission control characteristics or economics. The small quantity of ignition substances required by the torch cell will make practical the use of substances other than now conventional fuel oil.

An important further application of the invention is to allow use of lower engine compression ratios to accommodates sensitive fuel (low octane). The ignition source (torch cell) can be made to be more or less dependent on the heat generated by compression and therefore be tailored to function with specific applications. Heat sink detail and use of externally powered heat sources offer wide flexibility.

Full diesel engine capability is retained with this invention by use of conventional injection equipment 40 installed in the cylinder head 24 and may be provided with cooling, as is well known, to preserve functional capability while on standby. Switching during operation to and from full diesel mode operation would incorporate standard procedures currently available.

Other variations and mechanical equivalents will become apparent to those skilled in the art when this specification is read in conjunction with the appended claims and the intent is for such claims to be read as broadly as permitted by existing art.

We claim:

1. In a dual gas-liquid fuel four cycle engine having a plurality of cylinders and wherein each cylinder is operatively connected thereto and each cylinder has a piston, two inlet valves, two exhaust valves and a first liquid fuel injector comprising:

at least one fuel torch cell operatively connected to at least one cylinder, said torch cell having a torch cell nozzle at one end thereof and the other end having appropriate means to connect said torch cell to a fuel supply, a second fuel injector mounted in said torch cell at a predetermined angle to an axis of said torch cell, said torch cell defining an auto-ignition chamber,

*said auto-ignition chamber is sized to provide an auto-ignition volume of up to 25% of the volume of a main piston chamber measured when a piston in the piston chamber is at the top of said piston's stroke,* said second fuel injector being in operative communication with said auto-ignition chamber by an injector nozzle passageway, said injector nozzle passageway entering said auto-ignition chamber at a predetermined angle relative to said axis, and a torch nozzle passage connecting said auto-ignition chamber with said cylinder at a predetermined angle to a top inner portion of a cylinder head.

2. In the engine of claim 1 wherein said torch cell has at said one end a solid portion, said solid portion having a first and second end, an injector passage formed through said solid portion, said injector passage being sized to hold said second fuel injector at a predetermined angle to an axis of the torch cell, said second end having said torch nozzle and defining a generally segment spherical cavity with the spherical portion operatively connected to said injector nozzle passageway and which is combined with a generally segmented paraboloid cavity which is complimentary to the segmented spherical cavity to form said auto-ignition chamber which has a generally segmented sphere-paraboloid shape, and said torch nozzle passage connecting said auto-ignition chamber through the segment of said segmented paraboloid cavity.

3. In the engine of claim 1 wherein two liquid fuel torch cells are operatively connected to said one cylinder, said torch cells being operatively connected to said one cylinder adjacent a cylinder head periphery and each being between an inlet valve and an exhaust valve *and the two torch cells provide an auto-ignition chamber volume of up to 25% of the volume of the main piston chamber when the piston in the piston chamber is at the to of said piston's stroke.*

4. In the engine of claim 2 wherein two liquid fuel torch cells are operatively connected to said one cylinder, said torch cells being operatively connected to one cylinder adjacent a cylinder head periphery and each between an inlet valve and an exhaust valve [.], *and the two torch cells provide an auto-ignition chamber volume of up to 25% of the volume of the main piston chamber when the piston in the piston chamber is at the top of said piston's stroke.*

5. In the engine of claim 4 wherein the engine has at least 12 cylinders and two-liquid fuel torch cells are operatively connected to at least one cylinder.

6. In a dual gas-liquid fuel four cycle engine having at least 12 cylinders and wherein each cylinder has operatively connected thereto a piston, two inlet valves, two exhaust valves and a first liquid fuel injector comprising:

two liquid fuel torch cells operatively connected to at least one cylinder, said torch cells being operatively connected to said one cylinder adjacent a cylinder head periphery and each being between an inlet valve and an exhaust valve, said torch cell having a generally tubular injector with a solid portion at one end thereof and the other end body with a solid portion at one end thereof and the other end having appropriate means to close said tubular body to a liquid fuel supply, said solid portion having a first and second end, said first end being in communication with the tubular injector body, an injector passage formed through said solid portion, said injector passage being sized to hold a second liquid fuel injector at a predetermined angle to an axis of the tubular body, said second fuel injector being mounted in said tubular injector body and said injector passage, said second end defining a generally hemi-spherical end cavity, said hemi-spherical cavity having a predetermined volume and being generally symmetrical about said axis of the tubular body, said second fuel injector having an injector nozzle, said injector nozzle being in operative communication with said hemi-spherical cavity by an injector nozzle passageway, said injector nozzle passageway entering said hemi-spherical cavity at a predetermined angle relative to said axis, a torch nozzle sealingly connected to said second end, said torch nozzle defining a segmented paraboloid cavity that is complimentary to the hemi-spherical cavity to form a combined generally segmented sphere-paraboloid auto-ignition chamber, [and] *and said two cell auto-ignition chambers providing an auto-ignition volume of up to 25% of the volume of a main piston chamber measured when a piston in the piston chamber is at the top of said piston'stroke,* a torch nozzle passage connecting said auto-ignition chamber with said cylinder at a predetermined angle to a top inner portion of a cylinder head and directed towards a cylinder head inner portion having a tapered groove formed thereon which tapers away from said torch nozzle passage.

7. An improved combustion system for dual fuel engines including a reciprocating engine capable of utilizing both a gaseous fuel as well as a liquid fuel, the ignition of the latter being accomplished by compression and auto-ignition, while the ignition of the preferable gaseous fuel being accomplished by an externally disposed torch cell [.] *and said torch cell having an auto-ignition chamber sized to provide auto-ignition chamber volume of up to 25% of the volume of a main piston chamber measured when a piston in the piston chamber is at the top of said piston's stroke.*

8. An improved combustion system for dual fuel engines as claimed in claim 7 wherein there is at least one cylinder and said external torch cell assembly includes port means for communicating with said at least one cylinder of said dual fuel engine [and said torch cell having an auto-iguition chamber].

9. An improved combustion system for dual engines as claimed in claim 8 wherein said auto-ignition chamber has a volume of from 1 to 5% [25%] of the volume of a main piston chamber measured when a piston in the piston chamber is at the top of said piston's stroke.

10. An improved combustion system for dual fuel engines as claimed in claim 8 wherein the ignition of said torch cell being normally accomplished by injection of a quantity of fuel with auto-ignition capability to accomplish start of combustion upon penetration to the torch cell by said port means of air/fuel mixture which has been raised to a given temperature by cylinder compression in said at least one cylinder.

11. An improved combustion system for dual fuel engines as claimed in claim 10 wherein ignition is initiated by contact of the liquid fuel ignition substance with a hot surface of said torch cell.

12. An improved combustion system for dual fuel engines as claimed in claim 11 wherein said fuel cell includes externally powered heaters for elevating the temperature gradient in the internal surfaces of said torch cell which serve to initiate ignition upon contact of the liquid fuel substances with the chamber surface of said torch cell.

13. An improved combustion system for dual fuel engines as claimed in claim 1 wherein said torch cell includes an internal generally segmented sphere-paraboloid auto-ignition chamber, a passageway communicating between said torch cell chamber and the main chamber of at least one chamber of at least one cylinder in a reciprocating engine formed by a piston and cylinder walls and cylinder head when said piston is at its uppermost position following compression strike, and means for introducing liquid fuel into said torch-cell chamber at the top of said compression stroke.

14. As improved combustion system for dual fuel engines as claimed in claim 23 wherein said passageway communicating with said torch cell chamber is substantially tangentially disposed relative to said cell chamber thereby air compressed by said piston and introduced via said passageway into said torch cell chamber is swirled therein.

15. As improved combustion system for dual feed assembly includes injection means for introducing said liquid fuel into said torch cell chamber, said injection means being angularly disposed relative to the axial diametrical disposition of said torch cell chamber.

16. An improved combustion system for dual fuel engines as claimed in claim 15 wherein said injection means is disposed between four and five degree off the said axis of said torch cell chamber.

17. An improved combustion system for dual fuel engines as claimed in claim 16 wherein said injection means is disposed substantially four degrees and thirty seconds off said axis.

18. An improved combustion system for dual fuel engines as claimed in claim 17 wherein said injection means is disposed in a passageway that communicates with said torch cell chamber, said passageway forming an opening into said torch cell chamber on one side of said axis, while said tangentially disposed passageway communicating with said cylinder chamber is located on the other side of said axis, whereby introduction of said ignition means into said torch cell chamber takes place in a following manner generally emulating the rotation of the swirling compressed air from said at least one cylinder.

19. An improved method of combustion for a dual fuel reciprocating engine including the steps of emitting a gaseous fuel mixture into the chamber of a cylinder of said engine, compressing said gaseous fuel mixture by means of a reciprocating piston within said cylinder, igniting said compressed fuel mixture at the top of the compression stroke within said cylinder chamber by means of a fuel torch cell disposed externally of said cylinder with said torch cell having an auto-ignition chamber, [.] *sized to provide an auto-ignition chamber volume of up to 25% of the volume of a main piston chamber measured when a piston in the piston chamber is at the top of said piston's stroke.*

20. The improved method as set forth in claim 19 wherein said torch cell includes port means that communicates with the said cylinder chamber, including the step of introducing a portion of said compressed gaseous mixture into said torch cell via said port means, and then introducing an auto-ignition liquid fuel into said cell thereby causing ignition of said liquid fuel upon contact with said compressed mixture and ignition of said compressed gaseous mixture in said mixture in said cylinder chamber via said port means.

21. The improved method set forth in claim 20 wherein said gaseous mixture in said cylinder chamber is a fuel lean mixture to insure complete combustion of said mixture.

22. The improved method as set forth in claim 21 wherein said fuel mixture in said torch cell is a liquid fuel rich mixture to insure complete combustion of said liquid fuel mixture as well as insure complete ignition and combustion of said fuel lean mixture in said cylinder chamber.

23. The improved method of claim 22 wherein the engine has one or more cylinders and one or more torch cells, the quantity of auto-ignition fuel introduced to the torch cell auto-ignition chamber of chambers is a fraction of one percent to fifty percent of the total fuel used by said engine depending on the relative size geometry and number of auto-ignition chambers.

24. The improved method as set forth in claim 21 wherein said lean mixture would have an air to fuel ratio in excess of 10 to 1.

25. The improved method as set forth in claim 24 wherein said lean mixture has an air to fuel ratio of substantially 12 to 1.

26. The improved method as set forth in claim 22 wherein said rich fuel mixture includes an air to fuel ratio of less than 10 to 1.

27. The improved method as set forth in claim 26 wherein said rich fuel mixture includes an air fuel ratio of substantially 8 to 1.

28. The improved method as set forth in claim 20 wherein said injector passage being sized to hold a second liquid said liquid fuel used in said method has a cetane rating such that it will auto-ignite at a predetermined pressure or temperature.

29. The improved method as set forth in claim 28 wherein the cetane rating of said gaseous mixture is such that it would not ignite at said predetermined pressure alone.

30. The improved method as set forth in claim 29 wherein said liquid fuel is diesel fuel oil.

31. The improved method as set forth in claim 20 wherein said torch cell includes a substantially spherical chamber, said port means being tangentially disposed relative to said torch cell chamber to provide a swirling effect on said compressed gaseous mixture introduced into said torch cell chamber from said cylinder chamber.

32. The improved method as set forth in claim 31 wherein said fuel is introduced into said compressed swirling gaseous mixture at a predetermined angle to join the flow thereof and insure complete combustion following ignition.

33. The improved method as set forth in claim 32 wherein said predetermined angle is between four and five degrees askew of the axis of said torch cell chamber whereby said fluid fuel is insured of total mixture with said compressed gaseous mixture that has been introduced via said port means.

34. The improved method as set forth in claim 20 wherein energy is introduced into independent heating elements for elevating the temperature of said torch cell chamber walls thereby accelerating the auto-ignition of said fluid fuel.

35. A fuel torch cell for an engine having at least one cylinder and wherein said one cylinder has operatively connected thereto a piston, at least one inlet valve, as lest one exhaust valve and a first fuel injector with said torch cell being adapted to be operatively connected to said one cylinder, comprising:

said torch cell having a torch cell nozzle at one end thereof and the other end having appropriate means to connect said torch cell up to a fuel supply, a second fuel injector mounted in said torch cell at a predetermined angle to an axis of said torch cell, said torch cell defining an auto-ignition chamber,

*said auto-ignition chamber sized to provide an auto-ignition chamber volume of up to 25% of the volume of a main piston chamber measured when a piston in the piston chamber is at the top of said piston's stroke,* said second fuel injector being in operative communication with said auto-ignition chamber by an injector nozzle passageway, said injector nozzle passageway entering said auto-ignition chamber at a predetermined angle relative to said axis, and a torch nozzle passage connecting said auto-ignition chamber with said cylinder at a predetermined angle to a top inner portion of a cylinder head.

36. The torch cell of claim 35 wherein said torch cell auto-ignition chamber has operatively connected at one end an injector passage, said injector passage being sized to hold said second fuel injector at a predetermined angle to an axis of the torch cell, said auto ignition chamber one and having a generally segmented spherical shape with the spherical portion operatively connected to said injector nozzle passageway and at the other end a generally segmented paraboloid shape which is complimentary to the segmented spherical end to thereby form a generally segmented sphere-paraboloid shaped auto-ignition chamber, and said torch nozzle passage connecting said auto-ignition chamber through the segment of said segmented paraboloid.

37. A torch cell for a dual gas-liquid fuel four cycle engine having at least 12 cylinders and wherein each cylinder has operatively connected thereto a piston, two inlet valves, two exhaust valves and a first liquid fuel injector, comprising:

said torch cell having a generally tubular injector body with a solid portion at one end thereof and the other end having appropriate means to close said tubular body and connect said tubular body to a liquid fuel supply, said solid portion having a first and second end, said first end being in communication with the tubular injector body, an injector passage formed through said solid portion, said injector passage being sized to hold a second liquid fuel injector at a predetermined angle to an axis of the tubular body, said second injector being mounted in said tubular injector body and said injector passage, said second end defining a generally hemi-spherical cavity, said hemi-spherical cavity having a predetermined volume and being generally symmetrical about said axis of the tubular body, said second fuel injector having an injector nozzle, said injector nozzle being in operative communication with said hemi-spherical cavity by an injector nozzle passageway, said injector nozzle passageway entering said hemi-spherical cavity at a predetermined angle relative to said axis, a torch nozzle sealingly connected to said second end, said torch nozzle defining a nozzle segmented paraboloid cavity that is complimentary to the hemi-spherical cavity to form a combined generally segmented sphere-paraboloid auto-ignition chamber,

*said auto-ignition chamber sized to provide an auto-ignition chamber volume of 25% of the volume of an main piston chamber measured when a piston in the piston chamber is at the top of said piston's stroke,* and a torch nozzle passage to connect said auto-ignition chamber with said cylinder at a predetermined angle to a top inner portion of a cylinder head.

38. A cylinder head for an engine having a plurality of cylinders and wherein each cylinder head has operatively connected thereto at least one inlet valve and at least one exhaust valve, comprising:

said torch cell having a torch cell nozzle at one end thereof and the other end having appropriate means to connect said torch cell to a fuel supply, a second fuel injector mounted in said torch cell at a predetermined angle to an axis of said torch cell, said torch cell defining an auto-ignition chamber,

*said auto-ignition chamber sized to provide an auto-ignition chamber volume of up to 25% of the volume of a main piston chamber measured when a piston in the piston chamber is at the top of said piston's stroke,* said second fuel injector being in operative communication with said auto-ignition chamber by an injector nozzle passageway, said injector nozzle passageway entering said auto-ignition chamber at a predetermined angle relative to said axis, and a torch nozzle passage connecting said auto-ignition chamber with said cylinder head at a predetermined angle to a top inner portion of said cylinder head.

39. The cylinder head of claim 38 wherein said torch cell auto-ignition chamber has operatively connected at one end an injector passage, said injector passage being sized to hold said second fuel injector at a predetermined angle to an axis of the torch cell, said auto ignition chamber one end having a generally segmented spherical shape with the spherical portion operatively connected to said injector nozzle passageway and at the other end a generally segmented paraboloid shape which is complimentary to the segmented spherical end to thereby from a generally segmented sphere-paraboloid shaped auto-ignition chamber, and said torch nozzle passage connecting said auto-ignition chamber through the segment of said segmented paraboloid.

40. The cylinder head of claim 39 for a dual gas-liquid fuel four cycle engine having at least 12 cylinders and wherein each cylinder head has operatively connected thereto, two inlet valves, two exhaust valves and a first liquid fuel injector comprising:

two liquid fuel torch cells operatively connected to said cylinder head, said torch cells being operatively connected to said cylinder head adjacent a cylinder head periphery and each mounted between an inlet valve and an exhaust valve, said torch cell having a generally tubular injector body with a solid portion at one end thereof and the other end having appropriate means to close said tubular body and connect said tubular body to a liquid fuel supply, said solid portion having a first and second end, said first end being in communication with the tubular injector body, an injector passage formed through said solid portion, said injector passage being sized to hold a second liquid fuel injector at a predetermined angle to an axis of the tubular body, said second injector being mounted in said tubular injector body and said injector passage, said second end defining a generally hemi-spherical cavity, said hemi-spherical cavity having a predetermined volume and being generally symmetrical about said axis of the tubular body, said second fuel injector having an injector nozzle, said injector nozzle being in operative communication with said hemi-spherical cavity by an injector nozzle passageway, said nozzle passageway entering said hemi-spherical cavity at a predetermined angle relative to said axis, a torch nozzle sealingly connected to said second end, said torch nozzle defining a nozzle segmented paraboloid cavity that is complimentary to the hemi-spherical cavity to form a combined generally segmented sphere-paraboloid auto-ignition chamber, and a torch nozzle passage connecting said auto-ignition chamber at a predetermined angle to a top inner portion of said cylinder head and directed towards a cylinder head inner portion having a tapered groove formed thereon which tapers away from said torch nozzle passage.

*41. The combustion system of claim 7 wherein the system is a dual gas liquid fuel system for a four cycle engine having a plurality of cylinders with each cylinder having a piston, two inlet valves, two exhaust valves and a first fuel injector capable of feeding liquid fuel to said cylinder,*

*said system having at least one fuel torch cell operatively connected to at least one cylinder,*

*said torch cell having a torch cell nozzle at one end thereof and the other end having appropriate means to connect*

*said torch cell to a fuel supply,*

*said torch cell defining an auto-ignition chamber,*

*a second fuel injector mounted in said torch cell,*

*and said second fuel injector being in operative communication with said auto-ignition chamber by an injector nozzle passageway.*

*42. The combustion system of claim 41 wherein a torch nozzle passage connecting said auto-ignition chamber with said cylinder at a predetermined angle to a top inner portion of a cylinder head.*

*43. The combustion system of claim 41 wherein said torch cell has at said one end a solid portion,*

*said solid portion having a first and second end,*

*an injector passage formed through said solid portion,*

*said injector passage being sized to hold said second fuel injector,*

*said second end of said torch nozzle defining a generally segment spherical cavity with the spherical portion operatively connected to said injector nozzle passageway and which is combined with a generally segmented paraboloid cavity which is complementary to the segmented spherical cavity to form said auto-ignition chamber which has a generally segmented sphere-paraboloid shape, and*

*said torch nozzle passage connecting said auto-ignition chamber through the segment of said segmented paraboloid cavity.*

*44. In the engine of claim 1 or 6 wherein the auto-ignition chamber volume is up to 5% of the volume of the main piston chamber measured when the piston in the piston chamber is at the top of said piston's stroke.*

*45. An improved combustion system for dual fuel engines as claimed in any one of claims 7 to 18 and 41 to 43 wherein the auto-ignition chamber volume is up to 5% of the volume of the main piston chamber measured when the piston in the piston chamber is at the top of said piston's stroke.*

*46. The torch cell of claim 35, 36 or 37 wherein the auto-ignition chamber volume is up to 5% of the volume of the main piston chamber measured when the piston in the piston chamber is at the top of said piston's stroke.*

*47. The cylinder head of claim 38, 39 or 40 wherein the auto-ignition chamber volume is up to 5% of the volume of the main piston chamber measured when the piston in the piston chamber is at the top of said piston's stroke.*

* * * * *

UNITED STATES PATENT AND TRADEMARK OFFICE

CERTIFICATE OF CORRECTION

PATENT NO. : RE 34,807

DATED : December 20, 1994

INVENTOR(S) : Frederick S. Schaub and Jesse G. Smith

It is certified that error appears in the above-indentified patent and that said Letters Patent is hereby corrected as shown below:

Column 5, line 23 change "preferably" to --preferable--.

Column 6, line 6 change "source of air and or" to --sources of air and/or--

Column 6, line 27 and 28 change "accomodates" to --accommodate--.

Column 7, line 31, change "the to" to --the top--.

Column 7, line 57 after "injector" insert --body--.

Column 7, lines 58-60, delete "and the other end body with a solid portion at one end thereof"

Column 7, line 61, after "body" insert --and connect said tubular body--.

Column 9, line 13 delete "strike" and insert --stroke--.

Column 9, line 16 cancel "As" and insert --An--.

Column 9, line 17 cancel "23" and insert --13--.

Column 9, line 23 cancel "As" and insert --An--; line 23, cancel "feed" and insert --fuel engines as claimed in claim 14 wherein said torch cell--.

Column 10, line 16 cancel "of" and insert --or--.

Column 10, lines 34 and 35 delete "injector passage being sized to hold a second liquid said".

UNITED STATES PATENT AND TRADEMARK OFFICE

CERTIFICATE OF CORRECTION

PATENT NO. : RE 34,807

DATED : December 20, 1994

INVENTOR(S) : Frederick S. Schaub and Jesse G. Smith

It is certified that error appears in the above-indentified patent and that said Letters Patent is hereby corrected as shown below:

Column 11, lines 1 and 2 cancel "as lest" and insert --at least--.

Column 11, line 7, cancel "up"; line 28 cancel "and" and insert --end--.

Column 12, line 8 before "25%" insert --up to--.

Column 12, line 48, change "from" to --form--; line 53, cancel "39" and insert --38--.

Signed and Sealed this

Twenty-fourth Day of February, 1998

*Attest:*

Bruce Lehman

BRUCE LEHMAN

*Attesting Officer*

*Commissioner of Patents and Trademarks*